| (12) | United States Patent | (10) Patent No.: | US 9,767,698 B2 |
|---|---|---|---|
| | Burke et al. | (45) Date of Patent: | Sep. 19, 2017 |

(54) METHODS AND SYSTEMS FOR FACILITATING STOPS FOR VEHICLES EN ROUTE TO A COMMON DESTINATION

(71) Applicant: GM Global Technology Operations LLC, Detroit, MI (US)

(72) Inventors: Denis R. Burke, Canton, MI (US); Daniel E. Rudman, West Bloomfield, MI (US); Keith A. Fry, Rochester Hills, MI (US); Shane M. McCutchen, Howell, MI (US); Matthew N. Hovey, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 272 days.

(21) Appl. No.: 13/834,801

(22) Filed: Mar. 15, 2013

(65) Prior Publication Data

US 2014/0282093 A1 Sep. 18, 2014

(51) Int. Cl.
 *G08G 1/00* (2006.01)
 *H04L 29/08* (2006.01)
 *H04W 4/02* (2009.01)
 *H04W 4/04* (2009.01)
 *H04W 4/18* (2009.01)

(52) U.S. Cl.
 CPC ............ *G08G 1/22* (2013.01); *H04L 67/125* (2013.01); *H04W 4/022* (2013.01); *H04W 4/023* (2013.01); *H04W 4/027* (2013.01); *H04W 4/028* (2013.01); *H04W 4/046* (2013.01); *H04W 4/18* (2013.01)

(58) Field of Classification Search
 CPC ................................. G08G 1/22; H04L 67/125
 USPC .......................................................... 715/753
 See application file for complete search history.

(56) References Cited

U.S. PATENT DOCUMENTS

| 2004/0236504 A1* | 11/2004 | Bickford et al. ............. 701/207 |
|---|---|---|
| 2007/0168118 A1* | 7/2007 | Lappe et al. .................. 701/207 |
| 2009/0171567 A1 | 7/2009 | Morimoto et al. |
| 2012/0136689 A1* | 5/2012 | Ickman ............. G06Q 10/1095 705/7.19 |

(Continued)

FOREIGN PATENT DOCUMENTS

| CN | 101389928 A | 3/2009 |
|---|---|---|
| CN | 102713224 A | 10/2012 |

(Continued)

OTHER PUBLICATIONS

State Intellectual Property Office of the People's Republic of China, Office Action in Chinese Application No. 201410096640.7 mailed Aug. 19, 2015.

(Continued)

*Primary Examiner* — Tadeese Hailu
*Assistant Examiner* — Darrin Hope
(74) *Attorney, Agent, or Firm* — Lorenz & Kopf, LLP

(57) ABSTRACT

Methods and systems are provided for facilitating stops for vehicles en route to a common destination. A request is received from a first vehicle, the request pertaining to a desire to make a particular type of stop en route to a destination. Information pertaining to the request is transmitted to one or more additional vehicles that are also en route to the destination. Feedback is obtained from the first vehicle, the second vehicle, or both, as to a desired location for the stop.

8 Claims, 7 Drawing Sheets

(56) References Cited

U.S. PATENT DOCUMENTS

2014/0005941 A1* 1/2014 Paek .................. G01C 21/3438
701/533

FOREIGN PATENT DOCUMENTS

| DE | 102009019607 A1 | 11/2010 |
|---|---|---|
| EP | 1876051 A1 | 1/2008 |

OTHER PUBLICATIONS

German Patent and Trade Mark Office, Office Action in German Patent Application No. 10 2012 221 708.8 mailed Dec. 5, 2016.

* cited by examiner

METHODS AND SYSTEMS FOR FACILITATING STOPS FOR VEHICLES EN ROUTE TO A COMMON DESTINATION

TECHNICAL FIELD

The present technical field generally relates to the field of vehicles and, more specifically, to methods and systems for facilitating stops for vehicles en route to a common destination.

BACKGROUND

Many vehicles today include vehicle navigation systems that provide information to the occupants of the vehicle as to a location of the vehicle. The occupants of certain vehicles may also be travelling to a common destination as to known occupants of one or more other vehicles (such as family or friends travelling to a common destination). However, it may be difficult or cumbersome to remain in continuous communication with such other vehicles using common techniques, for example via telephone calls, conference calls, and text messages.

Accordingly, it may be desirable for occupants of such vehicles to more easily monitor and/or communicate with one another while en route to the common destination, for example in facilitating stops for such vehicles. Furthermore, other desirable features and characteristics of the present disclosure will become apparent from the subsequent detailed description of the disclosure and the appended claims, taken in conjunction with the accompanying drawings and this background of the disclosure.

SUMMARY

In accordance with an exemplary embodiment, a method is provided. The method comprises the steps of receiving a request from a first vehicle, the request pertaining to a desire to make a particular type of stop en route to a destination, transmitting information pertaining to the request to one or more additional vehicles that are also en route to the destination, and obtaining feedback from the first vehicle, one or more of the additional vehicles, or both, as to a desired location for the stop.

In accordance with another exemplary embodiment, a system is provided. The system comprises a memory and a processor. The memory stores a program configured to at least facilitate receiving a request from a first vehicle, the request pertaining to a desire to make a particular type of stop en route to a destination, transmitting information pertaining to the request to one or more additional vehicles that are also en route to the destination, and obtaining feedback from the first vehicle, one or more of the additional vehicles, or both, as to a desired location for the stop. The processor is coupled to the memory, and is configured to execute the program.

In accordance with a further exemplary embodiment, a system is provided. The system comprises an interface and a transmitter. The interface is configured to at least facilitate detecting a request from a first vehicle, the request pertaining to a desire to make a particular type of stop en route to a destination. The transmitter is configured to transmit information pertaining to the request to one or more additional vehicles that are also en route to the destination. The interface is further configured to receive feedback from the first vehicle, one or more of the additional vehicles, or both, as to a desired location for the stop.

BRIEF DESCRIPTION OF THE DRAWINGS

Certain embodiments of the present disclosure will hereinafter be described in conjunction with the following drawing figures, wherein like numerals denote like elements, and wherein.

DETAILED DESCRIPTION

The following detailed description is merely exemplary in nature, and is not intended to limit the disclosure or the application and uses thereof. Furthermore, there is no intention to be bound by any expressed or implied theory presented in the preceding technical field, background, or the following detailed description.

Figure 1:
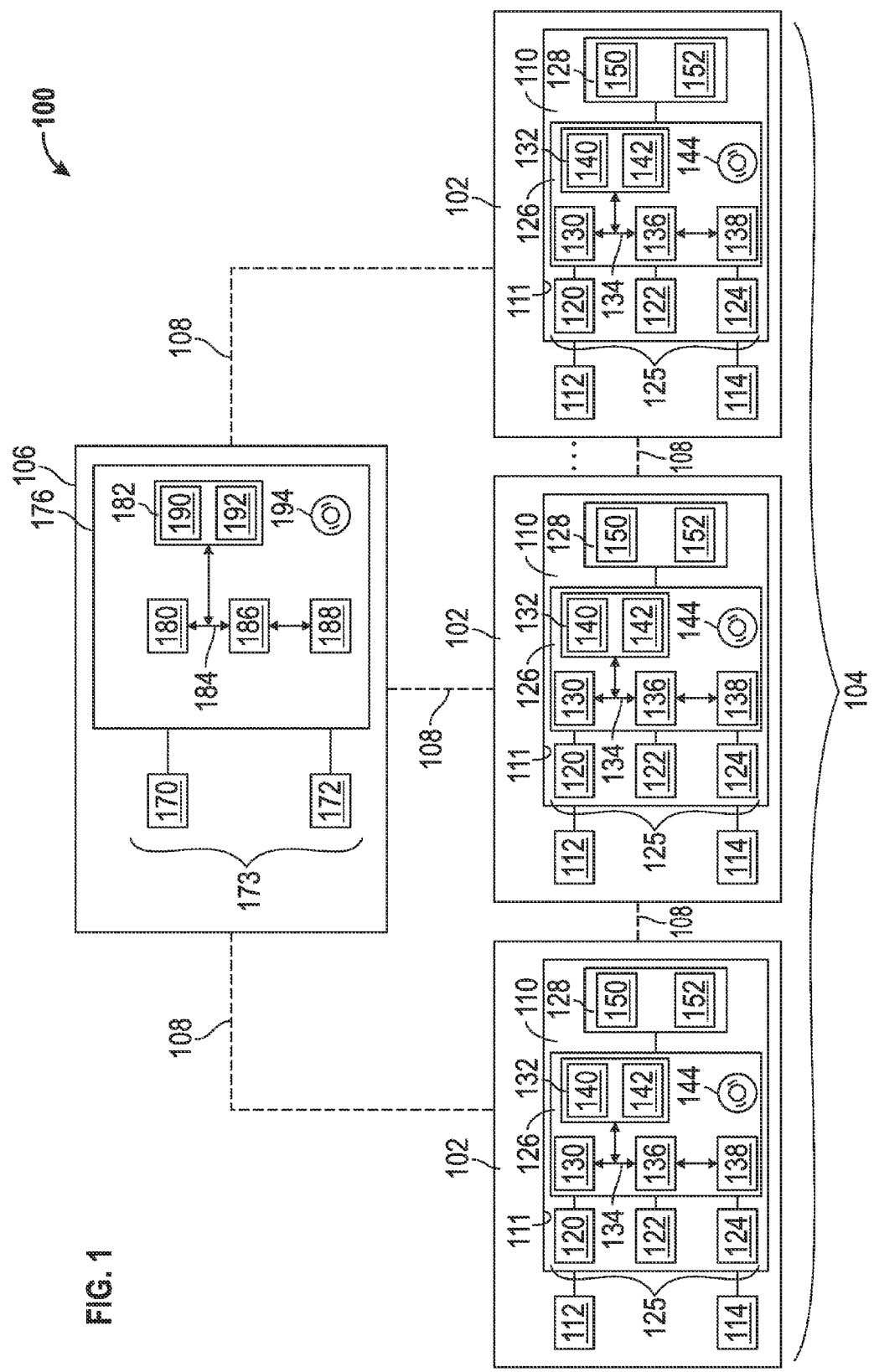
FIG. 1 is a functional block diagram of a caravan of vehicles en route to a common destination, along with a system for associating the vehicles in the caravan, in accordance with an exemplary embodiment.

FIG. 1 is a functional block diagram of a system for associating a plurality of vehicles 102 en route to a common destination. The vehicles 102 collectively form a caravan 104. By way of example, the caravan may include a group of families, friends, co-workers and/or associates headed to a common destination, such as a vacation destination, a theme park, a convention, a sporting event, a concert, or the like. Each of the vehicles 102 preferably comprises an automobile, such as a sedan, a truck, a van, a sport utility vehicle, or another type of automobile.

In certain embodiments, the vehicles 102 in the caravan 104 are preferably associated using a central server 106. The central server 106 communicates with the vehicles 102 via a wireless network 108, such as by way of example, a global communication network/Internet, a cellular connection, or one or more other types of wireless networks. In certain embodiments, the vehicles 102 may also communicate with one another over a wireless network 108, which may be the same or different as the wireless network by which the central server 106 communicates with the vehicles 102.

As depicted in FIG. 1, each vehicle 102 includes a control system 110 for association with the caravan 104. The control system 110 preferably provides a display and notification regarding position, movement, and inputs for each of the vehicles 102 in the caravan 104, along with information regarding various points of interest (for example, restaurants, gas or service stations, hotels, rest stops, retail stores, attractions, and the like) en route to the destination. In certain embodiments, the control system 110 includes the point of interest information, while in other embodiments the point of interest information may be obtained from a separate service (e.g., the central server 106 and/or services from one or more other sources) over the wireless network 108. In one embodiment, the control system 110 comprises a vehicle navigation system. In another embodiment, the control system 110 comprises a radio system for the vehicle 102 that is coupled to a vehicle navigation system.

As shown in FIG. 1, in certain embodiments the control system 110 is coupled to a personal communication device 112 (for example, a cellular telephone or smart phone) of an occupant of the vehicle, for example via a wired connection or a wireless connection (such as a Bluetooth or other short range wireless connection). Also as shown in FIG. 1, in certain embodiments the control system 110 may be coupled to one or more other vehicle systems 114 (such as a vehicle navigation system, a vehicle radio, a vehicle entertainment system, or the like) via one or more wired connections (such as a vehicle controller area network (CAN) bus) and/or wireless connections (for example via a wired connection or a wireless connection, such as a Bluetooth or other short range wireless connection).

In the embodiment shown in FIG. 1, the control system 110 includes a receiver 120, a transmitter 122, a user interface (also referred to herein as an input device) 124, a computer system 126, and a display and notification unit 128. In one embodiment, each of the components of the control system 110 is disposed within a common housing 111. Also in one embodiment, the control system 110 is disposed onboard the vehicle 102. In certain embodiments, various components of the control system 110 could be off-board or remote from the vehicle 102.

The receiver 120 is configured to receive signals and/or information pertaining to the vehicles 102 and various points of interest (POI) that may be near the vehicles 102 and/or a path of the vehicle 102 en route to the destination. The receiver 120 receives signals and information regarding a current geographic position or location of each of the vehicles 102. In one exemplary embodiment, the receiver 120 receives signals and information, including a signal representing a current position or location of the vehicle, from one or more satellites or as part of a global positioning system (GPS). In addition, the receiver 120 preferably receives signals and information from the central server 106 and from other vehicles 102 in the caravan, preferably via the wireless network 108.

The transmitter 122 is configured to transmit signals and/or information pertaining to the vehicles 102, and various points of interest (POI) that may be near the vehicle and/or a path of the vehicles 102 en route to the destination, and preferences and other inputs from occupants of the vehicles 102 (preferably as detected via the input devices 124 described herein). In one exemplary embodiment, the transmitter 122 transmits signals and information regarding a current geographic position or location of the vehicles 102, along with the inputs provided by the occupants of the vehicles 102.

The input device 124 is configured to obtain inputs from a user, preferably from one or more occupants of each of the vehicles 102. The user may use the input device 124 to provide a preference or a vote for a certain type of stop for the vehicles 102 in the caravan 104 (for example, for a desire to stop at a gas station, a restaurant, a hotel, a retail store, or another point of interest, and for a voting among the caravan 104 as to a selection of such a gas station, restaurant, or other point of interest for the caravan 104 to visit). The inputs received from the input device 124 are preferably transmitted to the other vehicles 102 in the caravan and/or to the central server 106 via the transmitter 122 of the vehicle 102. The user may also use the input device 124 to request that the control system 110 display certain types of information, such as specific types of points of interest in which the user may be interested. The input devices 124, along with the receivers 120 and transmitters 122, may also be collectively referred to as interfaces 125 throughout this application. In certain embodiments, the occupants of the vehicle 102 communicate with the input device 124 of the vehicle using their personal communication device 112 (for example, a cellular telephone or smart phone), such as via a Bluetooth or other short-range wireless connection, and in certain such embodiments the personal communication device 112 may also be considered to be part of the input device 124 and/or the interface 125.

The computer system 126 is coupled between the receiver 120, the transmitter 122, the input device 124, the other vehicle systems 114, and the display and notification unit 128. The computer system 126 receives the above-described signals, information, and user inputs from the receiver 120 and the input device 124, and facilitates the association of the vehicles 102 in the caravan 104 and the flow of information to and among the vehicles 102 in the caravan 104.

As depicted in FIG. 1, the computer system 126 includes a processor 130, a memory 132, a computer bus 134, an interface 136, and a storage device 138. The processor 130 performs the computation and control functions of the computer system 126 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 130 executes one or more programs 140 preferably stored within the memory 132 and, as such, controls the general operation of the computer system 126.

The processor 130 receives the above-referenced signals, information, and user inputs from the receiver 120, the input device 124, and the other vehicle systems 114. The processor 130 processes the signals, information, and user inputs and provides instructions to the display and notification unit 128 and for the association of and communication between the vehicles 102 in the caravan 104. In addition, in certain embodiments, the processor 130 also provides instructions for the transmission of signals and information by the transmitter 122 to the other vehicles 102 and/or to the central server 106. The processor 130 performs these functions in accordance with the steps of the process 200 depicted in FIG. 2 and described further below in connection therewith. In addition, in one exemplary embodiment, the processor 130 performs these functions by executing one or more programs 140 stored in the memory 132.

In executing these steps, the processor 130 preferably also utilizes a database 142 that is also stored in the memory 132. The database 142 preferably includes an identification of the vehicles 102 in the caravan 104 (and preferably including the occupants of the vehicles 102), various points of interest (such as restaurants, service stations, hotels, attractions, and other points of interest) en route to the destination and information pertaining thereto. In certain embodiments, the database 142 could also be off-board the vehicle (for example on the central server 106, as discussed in greater detail further below) and accessed via the transmitter 122 and the receiver 120.

The memory 132 can be any type of suitable memory. This would include the various types of dynamic random access memory (DRAM) such as SDRAM, the various types of static RAM (SRAM), and the various types of non-volatile memory (PROM, EPROM, and flash). In certain embodiments, the memory 132 is located on and/or co-located on the same computer chip as the processor 130. It should be understood that the memory 132 may be a single type of memory component, or it may be composed of many different types of memory components. In addition, the memory 132 and the processor 130 may be distributed across several different computers that collectively comprise the computer system 126. For example, a portion of the memory 132 may reside on a computer within a particular apparatus or process, and another portion may reside on a remote computer off-board and away from the vehicle.

The computer bus 134 serves to transmit programs, data, status and other information or signals between the various components of the computer system 126. The computer bus 134 can be any suitable physical or logical means of connecting computer systems and components. This includes, but is not limited to, direct hard-wired connections, fiber optics, infrared and wireless bus technologies.

The interface 136 allows communication to the computer system 126, for example from a vehicle occupant, a system operator, a remote, off-board database or processor, and/or another computer system, and can be implemented using any suitable method and apparatus. In certain embodiments, the interface 136 receives input from an occupant of the vehicle, preferably via the input device 124 of FIG. 1.

The storage device 138 can be any suitable type of storage apparatus, including direct access storage devices such as hard disk drives, flash systems, floppy disk drives and optical disk drives. In one exemplary embodiment, the storage device 138 is a program product from which memory 132 can receive a program 140 that executes the process 200 of FIG. 2 and/or steps thereof as described in greater detail further below. Such a program product can be implemented as part of, inserted into, or otherwise coupled to the control system 110. As shown in FIG. 1, the storage device 138 can comprise a disk drive device that uses disks 144 to store data. As one exemplary implementation, the computer system 126 may also utilize an off-board/off-vehicle Internet website, for example for providing or maintaining data or performing operations thereon.

It will be appreciated that while this exemplary embodiment is described in the context of a fully functioning computer system, those skilled in the art will recognize that certain mechanisms of the present disclosure may be capable of being distributed using various computer-readable signal bearing media. Examples of computer-readable signal bearing media include: flash memory, floppy disks, hard drives, memory cards and optical disks (e.g., disk 144). It will similarly be appreciated that the computer system 126 may also otherwise differ from the embodiment depicted in FIG. 1, for example in that the computer system 126 may be coupled to or may otherwise utilize one or more remote, off-board computer systems and/or other navigation systems. As used throughout this application, a remote computer system refers to a computer system that is off-board and outside the vehicle. For example, a remote computer system may be at a central processing facility for use with a number of different vehicles, among other possible examples.

The display and notification unit 128 is coupled to the computer system 126. In a preferred embodiment, the display and notification unit 128 comprises a visual component 150 (preferably a display screen, such as a liquid crystal display (LCD) screen) that generates images that are visible to occupants of the vehicle and an audio component 152 (such as a speaker) that generates sounds that can be heard by the occupants of the vehicle. It will be appreciated that the display and notification unit 128 may comprise one or more visual components 150 and/or audio components 152 together as one system and/or as separate systems.

The display and notification unit 128 provides a display of positions and movements of each of the vehicles 102 in the caravan 104, so that each of the vehicles 102 can quickly and easily identify locations for the other vehicles 102 in the caravan 104. The display and notification unit 128 also provides alerts when one of the vehicles 102 enters or exits a geo-fence region for the caravan 104. The display and notification unit 128 also provides information as to points of interest en route to the final destination as well as inputs received from each of the vehicles 102 in the caravan 104, for example for voting on whether, when, and where to stop at points of interest such as gas stations, restaurants, hotels, retail stores, and the like.

The central server 106 preferably associates the vehicles 102 in the caravan 104, monitors the vehicles 102 in the caravan 104 and the inputs from their occupants, and facilitates the flow of information between the vehicles 102 in the caravan 104. As depicted in FIG. 1, the central server 106 includes a receiver 170, a transmitter 172 and a computer system 176.

The receiver 170 is configured to receive signals and/or information pertaining to the vehicles 102 and various points of interest (POI) that may be near the vehicles 102 and/or a path of the vehicle 102 en route to the destination. The receiver 170 receives signals and information regarding a current geographic position or location of each of the vehicles 102. In one exemplary embodiment, the receiver 170 receives signals and information, including a signal representing a current position or location of the vehicle, from one or more satellites or as part of a global positioning system (GPS). In addition, the receiver 170 preferably receives signals and information from the central server 106 and from other vehicles 102 in the caravan, preferably via the wireless network 108.

The transmitter 172 is configured to transmit signals and/or information pertaining to the vehicles 102, and various points of interest (POI) that may be near the vehicle and/or a path of the vehicles 102 en route to the destination, and preferences and other inputs from occupants of the vehicles 102 (preferably as detected via the input devices 124 described below). In one exemplary embodiment, the transmitter 172 transmits signals and information regarding a current geographic position or location of the vehicles 102, along with the inputs provided by the occupants of the vehicles 102. The receivers 170 and transmitters 172 may also be collectively referred to as interfaces 173 throughout this application.

The computer system 176 is coupled between the receiver 170 and the transmitter. The computer system 176 receives the above-described signals, information, and user inputs from the receiver 170 and the input devices 124. The computer system 176 processes the various signals, information, and user inputs and provides instructions for the transmission of information and notifications to the vehicles 102 in the caravan 104. As depicted in FIG. 1, the computer system 176 includes a processor 180, a memory 182, a computer bus 184, an interface 186, and a storage device 188. The processor 180 performs the computation and control functions of the computer system 176 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 180 executes one or more programs 190 preferably stored within the memory 182 and, as such, controls the general operation of the computer system 176.

The processor 180 receives the above-referenced signals, information, and user inputs from the receiver 170. In addition, in certain embodiments, the processor 180 also provides instructions for the transmission of signals and information by the transmitter 172 to the vehicles 102 in the caravan 104. The processor 180 performs these functions in accordance with the steps of the process 200 depicted in FIG. 2 and described further below in connection therewith. In addition, in one exemplary embodiment, the processor 180 performs these functions by executing one or more programs 190 stored in the memory 182.

In executing these steps, the processor 180 preferably also utilizes a database 192 that is also stored in the memory 182. The database 192 preferably includes an identification of the vehicles 102 in the caravan 104 (and preferably including the occupants of the vehicles 102), various points of interest (such as restaurants, service stations, hotels, attractions, and other points of interest) en route to the destination and information pertaining thereto. In certain embodiments, the database 192 could also be on-board the vehicles 102 (for example, as discussed above).

The memory 182 can be any type of suitable memory. This would include the various types of dynamic random access memory (DRAM) such as SDRAM, the various types of static RAM (SRAM), and the various types of non-volatile memory (PROM, EPROM, and flash). In certain embodiments, the memory 182 is located on and/or co-located on the same computer chip as the processor 180. It should be understood that the memory 182 may be a single type of memory component, or it may be composed of many different types of memory components. In addition, the memory 182 and the processor 180 may be distributed across several different computers that collectively comprise the computer system 176. For example, a portion of the memory 182 may reside on a computer within a particular apparatus or process, and another portion may reside on a remote computer off-board and away from the vehicle.

The computer bus 184 serves to transmit programs, data, status and other information or signals between the various components of the computer system 176. The computer bus 184 can be any suitable physical or logical means of connecting computer systems and components. This includes, but is not limited to, direct hard-wired connections, fiber optics, infrared and wireless bus technologies.

The interface 186 allows communication to the computer system 176, for example a system operator, a remote, off-board database or processor, and/or another computer system, and can be implemented using any suitable method and apparatus.

The storage device 188 can be any suitable type of storage apparatus, including direct access storage devices such as hard disk drives, flash systems, floppy disk drives and optical disk drives. In one exemplary embodiment, the storage device 188 is a program product from which memory 182 can receive a program 190 that executes the process 200 of FIG. 2 and/or steps thereof as described in greater detail further below. Such a program product can be implemented as part of, inserted into, or otherwise coupled to the control system 110. As shown in FIG. 1, the storage device 188 can comprise a disk drive device that uses disks 194 to store data.

It will be appreciated that while this exemplary embodiment is described in the context of a fully functioning computer system, those skilled in the art will recognize that certain mechanisms of the present disclosure may be capable of being distributed using various computer-readable signal bearing media. Examples of computer-readable signal bearing media include: flash memory, floppy disks, hard drives, memory cards and optical disks (e.g., disk 194). It will similarly be appreciated that the computer system 176 may also otherwise differ from the embodiment depicted in FIG. 1, for example in that the computer system 176 may be coupled to or may otherwise utilize one or more remote, off-board computer systems and/or other navigation systems. As used throughout this application, a remote computer system refers to a computer system that is off-board and outside the vehicle. For example, a remote computer system may be at a central processing facility for use with a number of different vehicles, among other possible examples.

Figure 2:
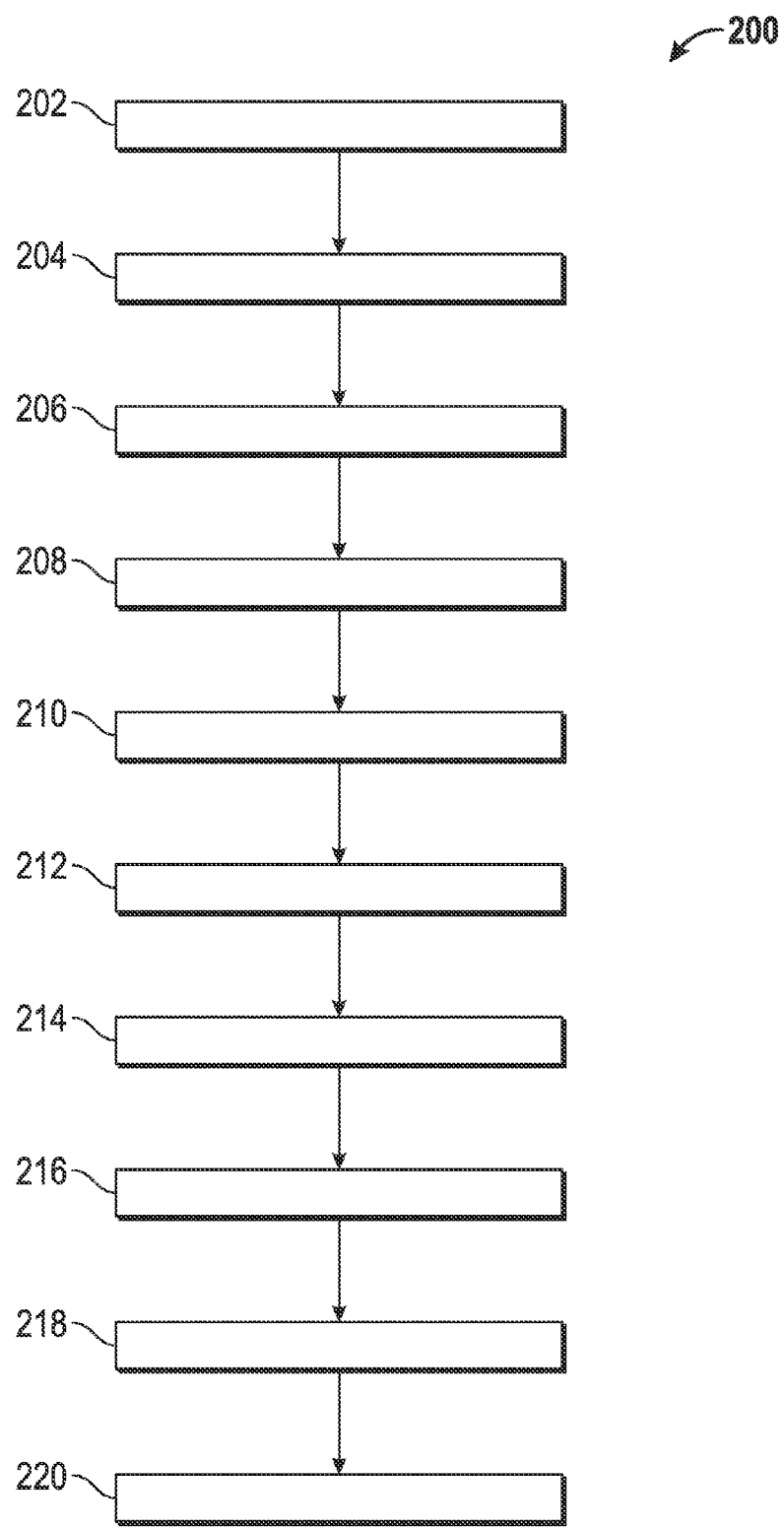
FIG. 2 is a flowchart of a process for associating vehicles en route to a common destination, such as the caravan of FIG. 1, and that can be used in connection with the system of FIG. 1, in accordance with an exemplary embodiment.

FIG. 2 is a flowchart of a process 200 for associating vehicles en route to a common destination, such as the caravan of FIG. 1. In a preferred embodiment, the process 200 can be implemented by the control system 110 of FIG. 1.

As depicted in FIG. 2, the process 200 includes the step of initiating a caravan sequence (step 202). In one such embodiment, an occupant of one of the vehicles 102 provides an input that is received or requested by the interface 125 (e.g., the input device 124) of his or her vehicle 102 with a request to initiate a caravan. This vehicle 102 (or the occupant thereof) is considered to be the leader of the caravan that is to be formed. In one embodiment, the request is processed by the computer system 126 of the leader's vehicle 102. In another embodiment, the request is transmitted by the transmitter 122 of the leader's vehicle 102 along the wireless network 108 to the central server 106 and is processed by the computer system 176 of the central server 106.

In addition, inputs are received as to a destination for the caravan (step 204). The destination information preferably includes the name, address, and/or other identifying information for a destination to which the caravan is travelling (such as an amusement park, a ski resort, a conference location, and/or any one of a number of other different vacation, business, and/or other places of interest). The destination inputs are preferably made by the leader of the caravan. The inputs are preferably received by the interface 125 (e.g., the input device 124) of the vehicle 102. In one embodiment, the destination inputs are processed by the computer system 126 of the leader's vehicle 102. In another embodiment, the destination inputs are transmitted by the transmitter 122 of the leader's vehicle 102 along the wireless network 108 to the central server 106 and are processed by the computer system 176 of the central server 106. In certain embodiments, the destination inputs may also include a preferred route to the destination.

Contact information is also received for prospective members of the caravan (step 206). The contact information preferably includes names and telephone numbers (and/or other identifying contact information) for other members of the caravan (e.g., potential members that the leader would like to invite to the caravan). The contact information is preferably received by the interface 125 (e.g., the input device 124) of the vehicle 102. In one embodiment, the contact information is processed by the computer system 126 of the leader's vehicle 102. In another embodiment, the contact information is transmitted by the transmitter 122 of the leader's vehicle 102 along the wireless network 108 to the central server 106 and is processed by the computer system 176 of the central server 106.

The prospective members of the caravan are contacted (step 208). Specifically, the prospective members of step 206 are contacted using the contact information of step 206 with an invitation to join the caravan. In one embodiment, the invitation is transmitted by the transmitter 122 of the leader's vehicle 102 to the other vehicles 102 that are to join the caravan 104, and the invitation appears on the display and notification units 128 of such vehicles 102. In another embodiment, the invitation is transmitted by the transmitter 172 of the central server 106, and the invitation appears on the display and notification units 128 of such vehicles 102.

The acceptance of the invitation is then received (step 210). Specifically, the occupants of the other vehicles 102 wishing to join the caravan may provide their acceptances to the invitation via the input devices 124 of their respective vehicles 102. The preferences are preferably received by the interface 125 (e.g., the input device 124) of the vehicle 102. The acceptances are preferably transmitted via the transmitters 122 of the respective vehicles 102 via the wireless network 108 to the leader's vehicle 102 and/or to the central server.

The caravan is then established (step 212). In one embodiment, the processor 130 of the computer system 126 of the leader's vehicle 102 processes the acceptances of steps 210 and establishes a caravan 104 for the vehicles 102 for those that accepted the invitation to join the caravan. In another embodiment, the processor 180 of the computer system 176 of the central server 106 forms the caravan 104 in this manner. In either case, the computer system that forms the caravan preferably monitors movement of each of the vehicles 102 in the caravan 104, for example via one or more global positioning system (GPS) devices and/or other communications with the vehicles 102 via the wireless network 108 (step 214). In addition, the computer system provides each vehicle 102 in the caravan 104 display that shows the geographic location of each other vehicle 102 in the caravan for display using the display and notification unit 128 of each vehicle 102 (step 216).

The caravan is preferably maintained using a geo-fence (step 218). Specifically, in one embodiment, a vehicle is considered to remain within the caravan so long as the vehicle remains within the geo-fence. Conversely, if a vehicle that was previously associated with the caravan re-enters the geo-fence, the vehicle will be deemed to have re-joined the caravan, and so on. The geo-fence is preferably utilized in this manner by one or more processors, such as one or more of the processors 130, 180 of FIG. 1. Additional details regarding a particular embodiment of the use of the geo-fence are provided in FIG. 3 and are discussed further below in connection therewith.

In addition, voting is facilitated for the selection of a location for the vehicles in the caravan to stop en route to the final destination (step 220). In one example, the occupants of the various vehicles 102 in the caravan 104 may vote for a particular type of vehicle stop for the caravan (e.g., for food), along with more detailed voting as to a particular type of point of interest (e.g., a particular type of restaurant to visit), and then to a specific point of interest (e.g., a specific restaurant location), and so on. Similar voting may be performed for service stations, hotels, rest stops, and other points of interest. The occupants preferably provide their votes via the input devices 124 of their respective vehicles 102 (e.g., via spoken or written commands). The votes are preferably received by the interfaces 125. In one embodiment, the votes are received by the input devices 124, transmitted by the transmitters 122 of the vehicles 102, received by the receivers 120, 170 of other vehicles 102 and/or of the central server 106 along the wireless network 108, and processed by one or more processors, such as the processor 180 of the central server 106 and/or by one or more processors 130 of the vehicles 102. Additional details regarding a particular embodiment of the voting process are provided in FIG. 4 and are discussed further below in connection therewith.

Figure 3:
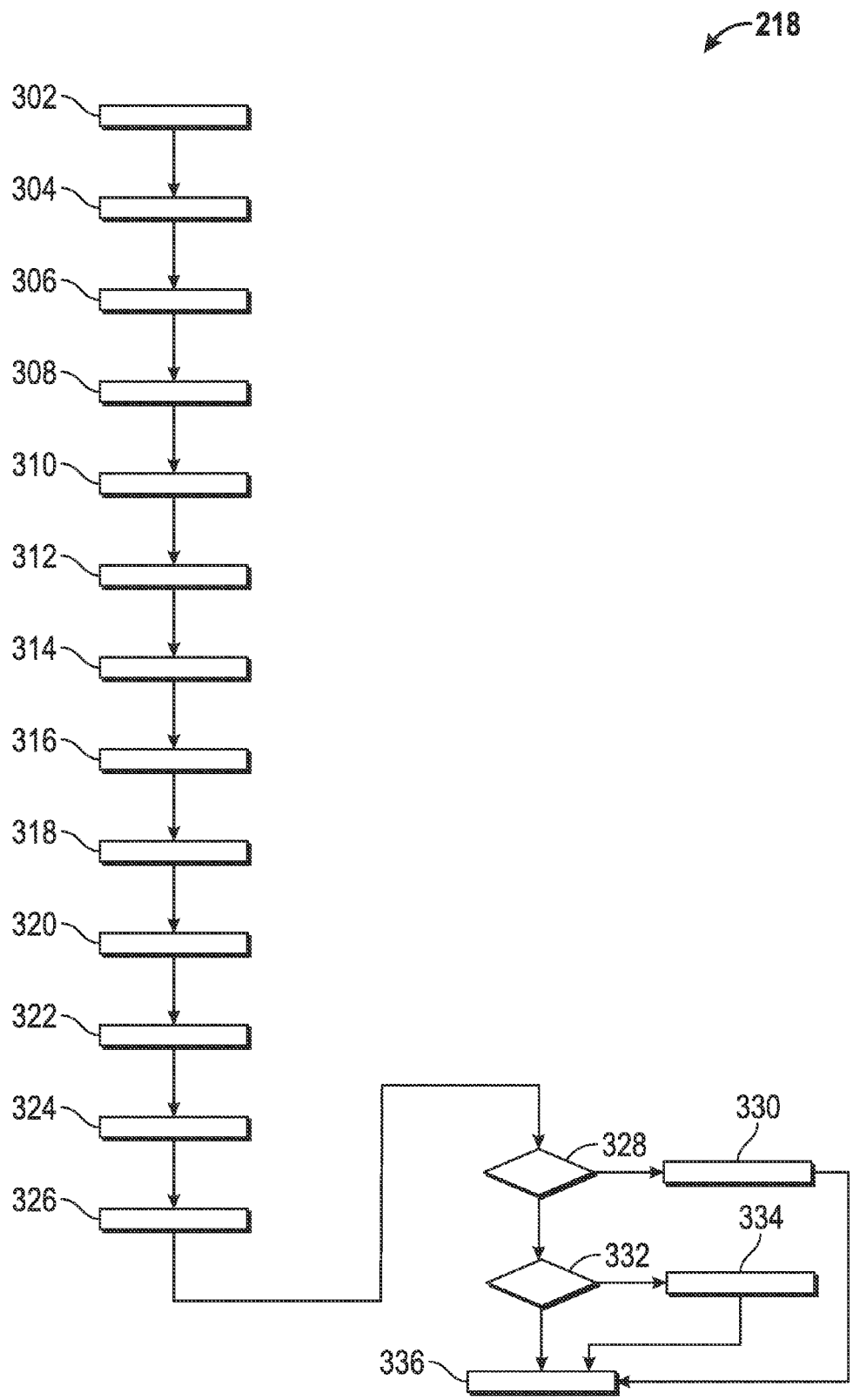
FIG. 3 is a flowchart of a sub-process of the process of FIG. 1, namely, maintaining a geo-fence for the vehicles en route to the common destination, in accordance with an exemplary embodiment.

FIG. 3 is a flowchart of a sub-process for step 218 of the process 300 of FIG. 3, namely, namely, maintaining a geo-fence for the vehicles en route to the common destination, in accordance with an exemplary embodiment. As depicted in FIG. 3, the sub-process 218 includes the step of obtaining a position of each vehicle in the caravan (step 302). During step 302, a geographic location (preferably, including latitude and longitude) is obtained for each of the vehicle 102 in the caravan 104. In one embodiment, the geographic location is monitored via global positioning system (GPS) devices and/or other communications with the vehicles 102 via the wireless network 108, and the geographic location information is monitored by one or more processors, such as the processors 130, 180 of FIG. 1.

In addition, a direction of travel is determined for each of the vehicles in the caravan (step 304). In one embodiment, the direction of travel is determined using information obtained via global positioning system (GPS) devices and/or other communications with the vehicles 102 via the wireless network 108 by one or more processors, such as the processors 130, 180 of FIG. 1. In one such embodiment, the processor(s) monitor changes in the GPS position over time to determine the current direction for each vehicle in the caravan. In certain other embodiments, the direction of travel for each vehicle may be obtained from each vehicle using data from one or more vehicle sensors, such as wheel sensors, steering wheel and/or other steering column sensors, and the like.

Vehicle speeds are determined for each of the vehicles in the caravan (step 306). In one embodiment, the speed for each vehicle is determined using information obtained via global positioning system (GPS) devices and/or other communications with the vehicles 102 via the wireless network 108 by one or more processors, such as the processors 130, 180 of FIG. 1. In one such embodiment, the processor(s) calculate the vehicle speeds via changes in the GPS position over time to determine the current direction for each vehicle in the caravan. In certain other embodiments, the speed for each vehicle may be obtained from one or more vehicle sensors, such as wheel sensors, accelerometers, and the like.

The routes of the various vehicles in the caravan are identified (step 308). In one embodiment, the routes are identified based on inputs provided by the occupants of the vehicles (e.g., as inputted into or provided by the navigation system of the vehicle). In other embodiments, the routes may be determined by tracking the geographic location of the vehicle over a period of time during the drive. The routes are preferably identified by one or more processors, such as the processor 130, 180 of FIG. 1.

Features are also identified from the road(s) on which the vehicles in the caravan are travelling (step 310). Such features may include, for example, a number or concentration of traffic lights and/or stop signs along the road(s), a classification of such road(s) as being highways or freeways (if applicable), a number of lanes on the road(s), posted speed limits for the road(s), and so on. The road features are preferably processed by one or more processors, such as the processor 130, 180 of FIG. 1. The features may be obtained, for example, via map data or travel history data stored in memory (such as the memory units 132, 182 of FIG. 1), via vehicle to vehicle communications, and/or from one or more other sources.

Traffic conditions are also obtained for the road(s) on which the vehicles in the caravan are travelling (step 312). Such traffic conditions may include, for example, a level of concentration of vehicles on the road(s), an average or estimated amount of time needed to travel a certain distance along the road(s) under current conditions, weather conditions, road closures, accidents, and the like. The traffic conditions are preferably processed by one or more processors, such as the processor 130, 180 of FIG. 1. The features may be obtained, for example, via radio communications (e.g. weather updates, traffic updates, and the like), online communications, vehicle to vehicle communications, via communications with the central server, and/or from one or more other sources.

Distances are calculated between the various vehicles in the caravan (step 314). The distances are preferably calculated based on current values of the geographic locations of the vehicles in step 302. The distances are preferably made by one or more processors, such as the processor 130, 180 of FIG. 1. In one embodiment, the distances are calculated "as the crows fly", or using straight line geometric distances. In another embodiment, the distances may be calculated using a shortest route that is drivable between two locations (i.e., in this case, between two vehicles), with the distance of that route being used as the overall distance between vehicles.

An estimated time of arrival is estimated among the vehicles in the caravan (step 316). The estimated time of arrival is preferably calculated for each vehicle in the caravan with respect to each other vehicle in the caravan. By way of example, if "Vehicle A" and "Vehicle B" are both in the caravan, and "Vehicle A" is further along en route to the destination as compared with "Vehicle B", then the estimated time of arrival between "Vehicle A" and "Vehicle B" represents the estimated time that it would take for "Vehicle B" to reach the current geographic location of "Vehicle A", and so on. The estimated time of arrival is preferably calculated for the various vehicles in the caravan in this manner by one or more of the processors 130, 180 of FIG. 1 using the geographic locations of step 302, the direction of travel of step 304, the speed of step 306, the routes of step 308, the road features of step 310, the traffic conditions of step 312, and the distances of step 314 for each of the vehicles 102 in the caravan of FIG. 1.

A determination is made as to whether there are any outliers among the vehicles in the caravan (step 318). For example, if one vehicle in the caravan is substantially farther away from the other vehicles in the caravan in terms of distance (from step 314) or time (from step 316), then such vehicle may be considered to be an "outlier" from the rest of the vehicles in the caravan. In one such embodiment, it may be determined that such "outlier" vehicle may not, at least for a period of time, be deemed to be part of the caravan. The determination of step 318 is preferably made by one or more processors, such as the processor 130, 180 of FIG. 1.

A determination is made as to whether there are any preferences for thresholds for maintaining the caravan (step 320). For example, in certain embodiments, one or more of the vehicles (e.g., the leader) of the caravan may set a particular threshold (e.g., in terms of distance of step 314 or time of step 316) for vehicles to remain in the caravan. This determination is preferably made by one or more processors, such as the processor 130, 180 of FIG. 1.

A geo-fence is determined for the caravan (step 322). The geo-fence comprises a virtual marking on a map around the caravan that represents geographic limits on the outer bounds of the caravan. In one embodiment, the geo-fence is based upon each of the following characteristics: the geographic locations of step 302, the direction of travel of step 304, the speed of step 306, the routes of step 308, the road features of step 310, the traffic conditions of step 312, the distances of step 314, the estimated times of step 316, the presence of any outliers of step 318, and any preferences of step 320. In general, the geo-fence is drawn to replicate the vehicle occupants' desire to set certain bounds (in terms of distance and/or time) that will represent whether particular vehicles are close enough (in terms of distance and/or time) to be considered to be part of the caravan. For example, in one implementation, if a particular vehicle is far ahead or far behind the caravan (in terms of time and/or distance), then such vehicle may be less likely to be included for a common vehicle stop at a restaurant, service station, or the like. The geo-fence is preferably generated and applied by one or more processors, such as the processor 130, 180 of FIG. 1.

The geo-fence is displayed for the vehicles in the caravan (step 324). Specifically, in each display and notification unit 128 of each of the vehicles 102 in the caravan 104 of FIG. 1, the visual display of the geographic location of each of the vehicles 102 also preferably includes the geo-fence as drawn on a map. The geo-fence is preferably provided on the display and notification unit 128 of each vehicle 102 via instructions provided by one or more processors, such as the processor 130, 180 of FIG. 1.

Figure 5:
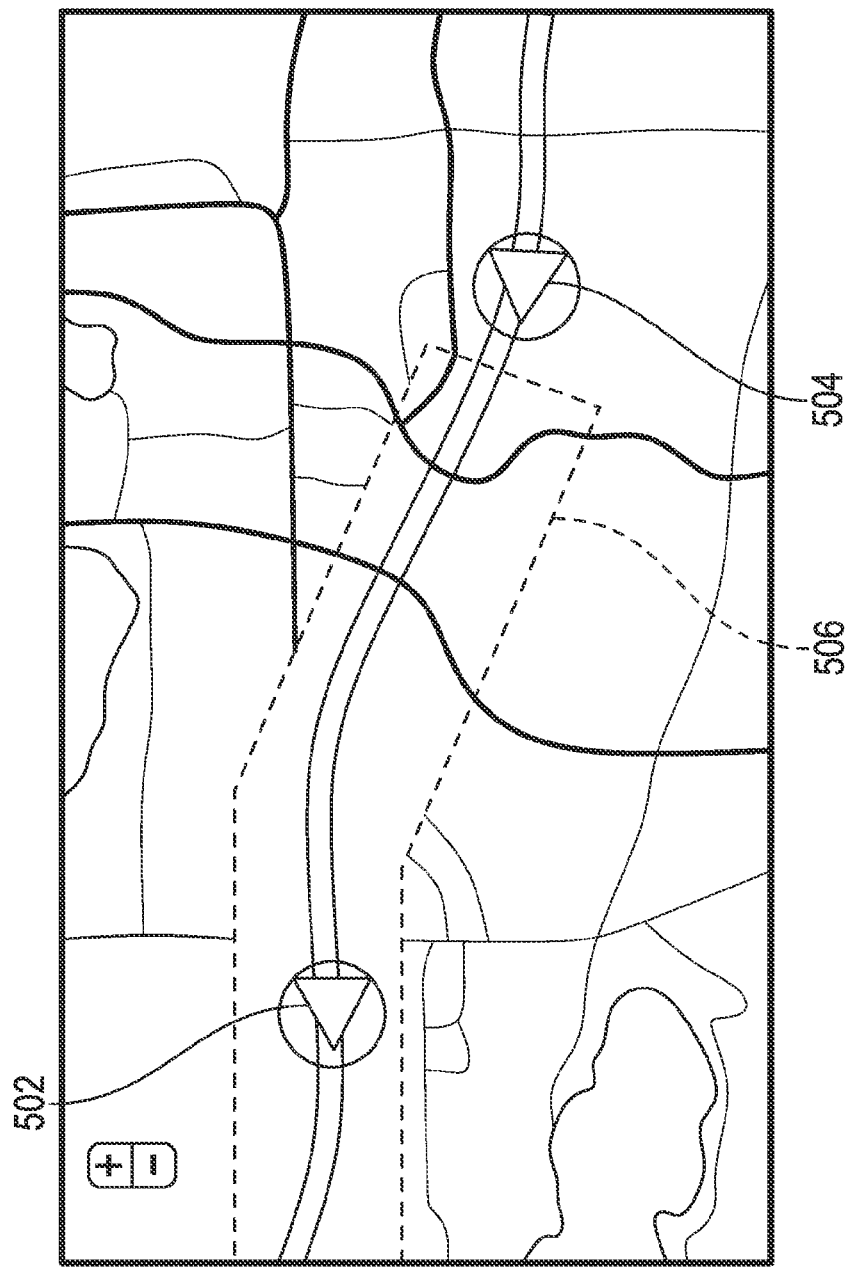
FIGS. 5-7 provide illustrations of screen displays for certain applications for the system of FIG. 1 and the processes of FIGS. 2-4, in accordance with an exemplary embodiment.

For example, with reference to FIG. 5, an illustrative display 500 is depicted in accordance with an exemplary embodiment. Also as shown in FIG. 5, the display 500 includes a depiction of the geo-fence 506. Also depicted is a geographic location and direction of travel of a first vehicle 502 within the geo-fence 506 area along with a geographic location and location of travel of a second vehicle 504 that is outside the geo-fence 506 area.

With reference again to FIG. 3, the display is preferably currently updated as the geographic location of the vehicles (and the resulting geo-fence) changes over time (step 326). Specifically, in the example of FIG. 5, the display 500 would continually be updated to show updated positions and directions of the vehicles 502, 504 as well as the updated geo-fence 506.

Whenever a vehicle in the caravan is approaching a boundary of the caravan, a determination is made as to whether the vehicle has moved outside the boundary of the geo-fence (step 328). This determination is preferably made by the one of the processors 130, 180 of FIG. 1 based on updated geographic location information. If it is determined that the vehicle from the caravan has moved outside of the geo-fence boundary, then the vehicle is deemed to no longer be part of the caravan (step 330), and the caravan and displays associated therewith are updated accordingly (step 336), preferably via instructions from one or more of the processor 130, 180 of FIG. 1.

Conversely, whenever a vehicle that was previously associated with the caravan (or for which an invitation to join the caravan was received and accepted in accordance with the process 200 of FIG. 2) and which has been outside the caravan boundary but is now approaching the caravan, a determination is made as to whether the vehicle has moved inside the boundary of the geo-fence (step 332). This determination is preferably made by the one of the processors 130, 180 of FIG. 1 based on updated geographic location information. If it is determined that the vehicle has moved inside the geo-fence boundary, then the vehicle is deemed to now be part of the caravan (step 334), and the caravan and displays associated therewith are updated accordingly (step 336), preferably via instructions from one or more of the processor 130, 180 of FIG. 1.

Figure 4:
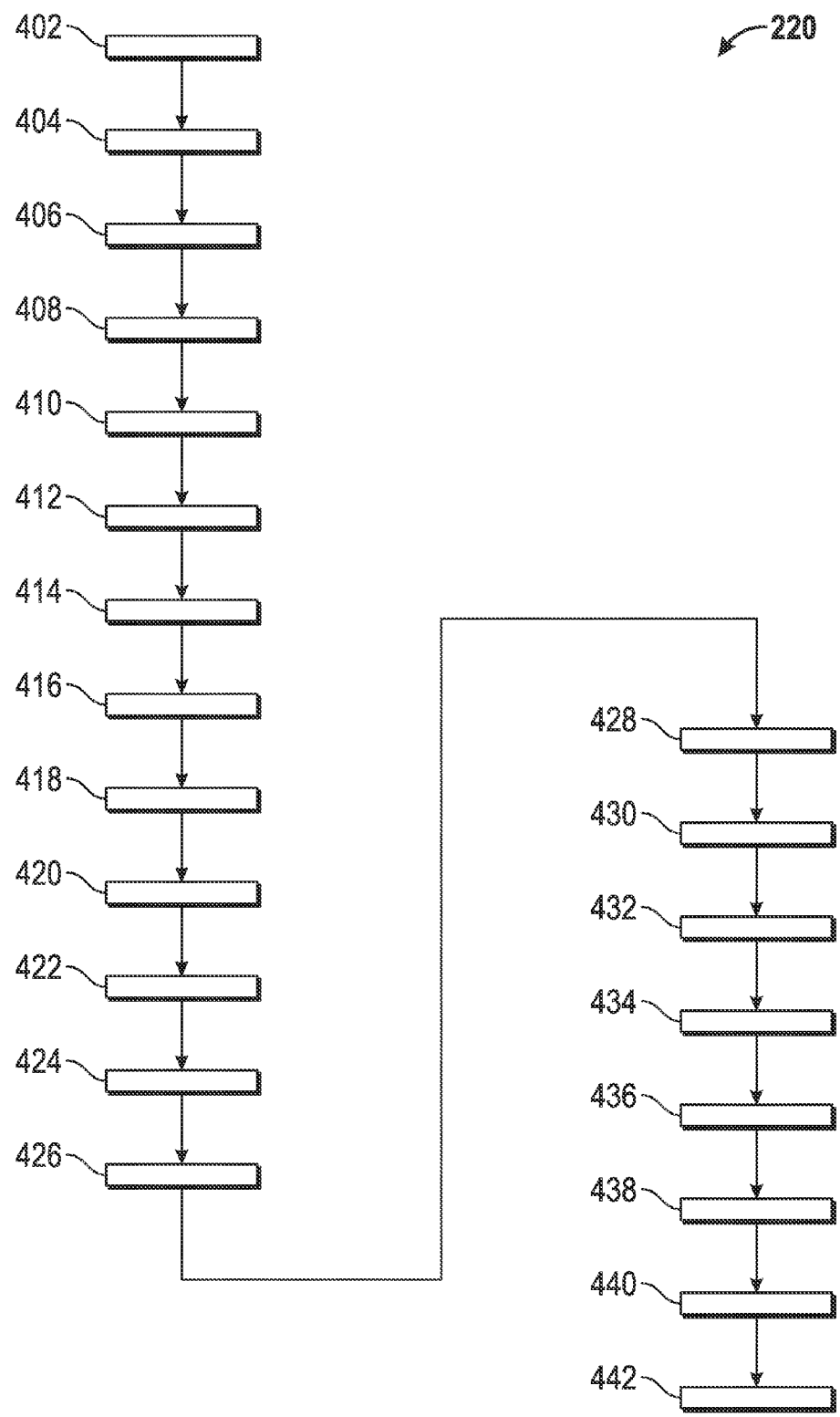
FIG. 4 is a flowchart of a sub-process of the process of FIG. 1, namely, for coordinating selection of stops en route to the destination, in accordance with an exemplary embodiment.

FIG. 4 is a flowchart of a sub-process for step 220 of the process of FIG. 1, namely, for voting and coordinating selection of stops en route to the destination, in accordance with an exemplary embodiment. As depicted in FIG. 4, the sub-process of step 220 includes the step of obtaining a position of each vehicle in the caravan (step 402). During step 402, a geographic location (preferably, including latitude and longitude) is obtained for each of the vehicle 102 in the caravan 104 (similar to step 302 of FIG. 3). In one embodiment, the geographic location is monitored via global positioning system (GPS) devices and/or other communications with the vehicles 102 via the wireless network 108, and the geographic location information is monitored by one or more processors, such as the processors 130, 180 of FIG. 1.

In addition, a direction of travel is determined for each of the vehicles in the caravan (step 404). In one embodiment, the direction of travel is determined using information obtained via global positioning system (GPS) devices and/or other communications with the vehicles 102 via the wireless network 108 by one or more processors, such as the processors 130, 180 of FIG. 1 (similar to step 304 of FIG. 3). In one such embodiment, the processor(s) monitor changes in the GPS position over time to determine the current direction for each vehicle in the caravan. In certain other embodiments, the direction of travel for each vehicle may be obtained from each vehicle using data from one or more vehicle sensors, such as wheel sensors, steering wheel and/or other steering column sensors, and the like.

Vehicle speeds are determined for each of the vehicles in the caravan (step 406). In one embodiment, the speed for each vehicle is determined using information obtained via global positioning system (GPS) devices and/or other communications with the vehicles 102 via the wireless network 108 by one or more processors, such as the processors 130, 180 of FIG. 1 (similar to step 306 of FIG. 3). In one such embodiment, the processor(s) calculate the vehicle speeds via changes in the GPS position over time to determine the current direction for each vehicle in the caravan. In certain other embodiments, the speed for each vehicle may be obtained from one or more vehicle sensors, such as wheel sensors, accelerometers, and the like.

The routes of the various vehicles in the caravan are identified (step 408). In one embodiment, the routes are identified based on inputs provided by the occupants of the vehicles (e.g., as inputted into or provided by the navigation system of the vehicle) (similar to step 308 of FIG. 3). In other embodiments, the routes may be determined by tracking the geographic location of the vehicle over a period of time during the drive. The routes are preferably identified by one or more processors, such as the processor 130, 180 of FIG. 1.

Initial inputs (or requests) are received from members of the caravan pertaining to preferences of the members of the caravan as to a preferred general type of point of interest for a vehicle stop (step 410). Preferably, the occupants of the various vehicles 102 in the caravan 104 provide initial inputs when the occupants wish to make a stop along the route, such as for a service station, restaurant, hotel, rest stop tourist attraction, or other point of interest. In one embodiment, the initial inputs of step 410 include a general classification of the type of vehicle stop that is desired (i.e., of the general type of point of interest that is desired). The initial inputs of step 410 preferably include a request from an occupant of a vehicle in the caravan for the caravan to make a stop at a particular category of a point of interest (such as, by way of example, a restaurant, a service station, a motel/hotel, a rest stop, or the like). For example, an occupant of a vehicle may verbally state or make a notation on a display screen for "food" or "restaurant" if the occupant wishes to eat, or "gas station" if the occupant wishes to stop at a gas station, or the like. The occupants preferably provide such inputs via the interfaces 125 (e.g., input devices 124) of their respective vehicles 102 (e.g., via spoken or written commands). The inputs are preferably received by the input devices 124 and processed by one or more processors, such as the processor 180 of the central server 106 and/or by one or more processors 130 of the vehicles 102 and transmitted by the transmitters 122, 172 via the wireless network 108.

The initial inputs of step 410 are then displayed (step 412). Preferably, the display and notification unit 128 of each vehicle 102 in the caravan 104 displays the initial inputs from each of the vehicles 102 in the caravan via instructions provided by one or more of the processors 130, 180 and as transmitted by transmitters of the respective interfaces 125, 173. For example, if an occupant of one of the vehicles 102 provides a request to stop at a restaurant (or a service station, or a hotel, or a rest stop, or another point of interest), then this request will appear in each vehicle 102 in the caravan 104 via the respective display and notification units 128 of such vehicles (e.g. via an audio and/or a visual notification).

Additional inputs (or votes) are received from other members of the caravan pertaining to the additional inputs (step 414). In one embodiment, the additional inputs pertaining to preferences of other members of the caravan as to whether they agree with the preference of the initial inputs. Specifically, the additional inputs of step 414 preferably include a first round of feedback from occupants of other vehicles in the caravan as to the initial request of step 410. For example, if an occupant of a first vehicle of the caravan indicates that he or she wishes to stop at a restaurant during initial inputs of step 410, then the additional members of the caravan may vote in step 414 as to whether they also wish for the caravan to stop at a restaurant, and so on. The occupants preferably provide such inputs via the interfaces 125 (e.g., input devices 124) of their respective vehicles 102 (e.g., via spoken or written commands). The inputs are preferably received by the input devices 124 and processed and tallied by one or more processors, such as the processor 180 of the central server 106 and/or by one or more processors 130 of the vehicles 102 and transmitted via the wireless network 108.

The additional inputs (or votes) of step 414 are then displayed (step 416). Preferably, the display and notification unit 128 of each vehicle 102 in the caravan 104 displays the additional inputs (or votes) from step 414 from each of the vehicles 102 in the caravan via instructions provided by one or more of the processors 130, 180 and as transmitted by transmitters of the respective interfaces 125, 173. For example, in the above-described example in which a caravan member has expressed a preference for stopping at a restaurant, a tally or count of the number of "votes" for stopping at a restaurant is displayed in step 416 in each vehicle 102 in the caravan 104 via the respective display and notification units 128 of such vehicles (e.g., via an audio and/or a visual notification).

Figure 6:
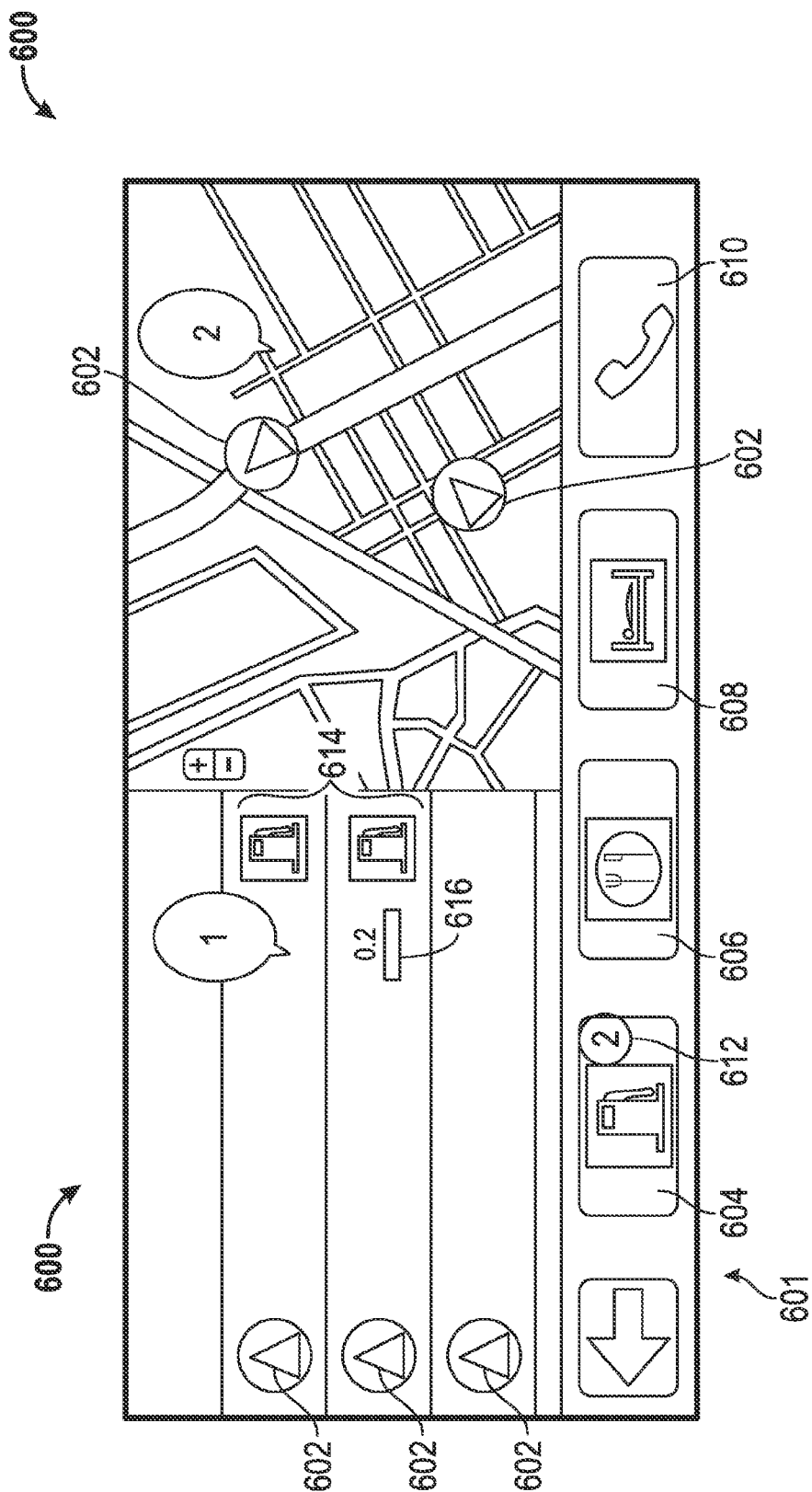

For example, with reference to FIG. 6, an exemplary display 600 depicts the name, geographic location, and direction of travel for various vehicles 602 in the caravan. The display 600 also includes a menu 601 of selections for voting, including voting options for gasoline (or service stations) 604, food (or restaurants) 606, and lodging (or hotels/motels) 608. Also depicted in the display is a telephone 610 menu option to conveniently call other vehicles in the caravan. As shown in the example of FIG. 6, a voting indicator 612 indicates that two vehicle members have voted for a gasoline (i.e., service station) stop. In addition, the display 600 includes identifications 614 of the caravan members that voted for a gasoline stop, along with distances 616 (e.g., in miles) between each member of the caravan and the caravan leader.

Figure 7:
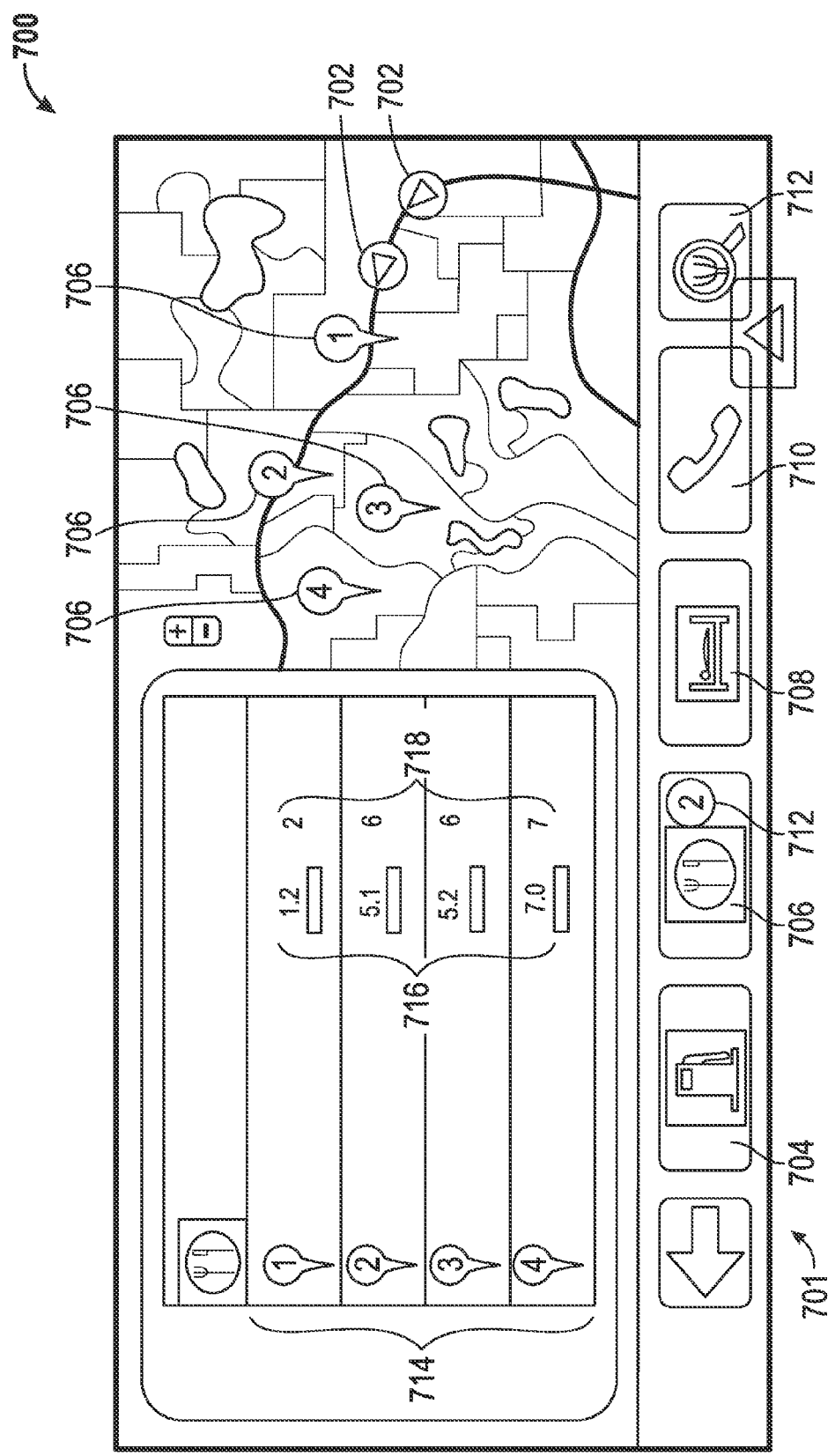

By way of further example, with reference to FIG. 7, another exemplary display 700 depicts the geographic location and direction of travel for various vehicles 702 in the caravan. The display 700 also includes a menu 701 of selections for voting, including voting options for gasoline (or service stations) 704, food (or restaurants) 706, and lodging (or hotels/motels) 708. Also depicted in the display is a telephone 710 menu option to conveniently call other vehicles in the caravan, as well as a microphone 712 menu option for providing inputs verbally for the interface 125 (e.g., input device 124). As shown in the example of FIG. 7, a voting indicator 712 indicates that two vehicle members have voted for a food (i.e., restaurant) stop. In addition, the display 700 includes various specific points of interest 714 (namely, different specific McDonald's brand restaurant locations 714, in this particular example), along with distances 716 (e.g. in miles) and estimated times of arrival 718 (e.g. in minutes) for the different locations 714 from the vehicle (preferably, with respect to the host vehicle for this particular display).

Returning to FIG. 4, a determination is made with respect to the inputs and voting of steps 410 and 414 (step 418). Specifically, a determination is made as to whether the caravan will proceed with a particular type of stop at a particular type of point of interest in accordance with the inputs and voting of steps 410 and 414. For example, in the above-described example in which a caravan member expressed a preference to stop at a restaurant in step 410, the determination of step 418 may comprise a determination as to whether sufficient votes were made in step 414 to stop at a restaurant, and so on. In one embodiment, this determination is made by the leader of the caravan, and is received via the input device 124 of the leader's vehicle 102. In another embodiment, the determination is made by one or more of the processors 130, 180 of FIG. 1 as to whether the vote tally of step 414 exceeds a predetermined threshold (e.g., as to whether a majority of caravan members have voted for the vehicle stop, or the like).

Once a determination is made in step 418 that the caravan will make a particular type of stop (e.g., for food, for gasoline, or the like), a query is made as to an additional level of detail as to the type of stop (step 420). For example, if it is determined in step 418 that the caravan will stop for food at a restaurant, then the query may pertain to a particular type of restaurant (e.g., fast food, diner, Mexican food, Italian food, or the like). By way of an additional example, if it is determined in step 418 that the caravan will stop for lodging, then the query of step 420 may pertain to a particular type of lodging (e.g., motel, family hotel, mid-range price hotel, luxury hotel, or the like). The query of step 420 is preferably made via the display and notification units 128 of the vehicles 102 in the caravan via instructions provided by one or more of the processor 130, 180 of FIG. 1.

Further inputs (or votes) are received from other members of the caravan pertaining to the query of step 420 (step 422). In one embodiment, the further inputs or votes of step 422 pertain to specific preferences of the type of point of interest in response to the query of step 420. The further inputs (or votes) of step 422 preferably comprise further feedback from the initial request of step 410. Specifically, the feedback of step 422 preferably pertains to a desired sub-category of the particular category of point of interest requested in step 410. For example, if the initial request of step 410 pertained to "food" or "restaurants' and the query of step 420 pertained to categories of restaurants, then the inputs or votes of step 422 may pertain to specific sub-categories of restaurants, for example whether the caravan members prefer fast food, a family diner or cafeteria, Mexican food, Italian food, or the like. By way of further example, if the query of step 420 pertained to types of lodging, then the inputs or votes of step 422 may pertain to whether the caravan members prefer a motel, a family hotel, a mid-range price hotel, a luxury hotel, or the like. The inputs are preferably received by the interfaces 125 (e.g., input devices 124) and processed and tallied by one or more processors, such as the processor 180 of the central server 106 and/or by one or more processors 130 of the vehicles 102 and transmitted via the wireless network 108.

The further inputs (or votes) of step 422 are then displayed (step 424). Preferably, the display and notification unit 128 of each vehicle 102 in the caravan 104 displays the further inputs (or votes) from step 422 from each of the vehicles 102 in the caravan via instructions provided by one or more of the processors 130, 180 and as transmitted by transmitters of the respective interfaces 125, 173. For example, if the voting pertains to types of restaurants, then a tally or count of the number of "votes" for different types of restaurants (e.g., fast food, diners, Mexican food, Italian food, and the like) is displayed in step 424 in each vehicle 102 in the caravan 104 via the respective display and notification units 128 of such vehicles (e.g., via an audio and/or a visual notification).

A determination is made with respect to the inputs and voting of step 422 (step 426). Specifically, a determination is made as to which particular type of the desired point of interest will be visited by the caravan in accordance with the voting of step 422. For example, in the above-described example in which a caravan member expressed a preference to stop at a restaurant in step 410, the determination of step 426 may comprise a determination that the caravan has voted for fast food, depending on the number of votes in step 422, and so on. In one embodiment, this determination is made by the leader of the caravan, and is received via the input device 124 of the leader's vehicle 102. In another embodiment, the determination is made by one or more of the processors 130, 180 of FIG. 1, for example as being the type of point of interest with the most votes in step 422.

Various points of interest are identified based on the caravan voting (step 428). In one embodiment, during step 428, a number of points of interest are identified along the route that the caravan is taking that correspond to the selection of step 426. For example, in one such embodiment, if the caravan voting is determined to represent fast food, then various fast food restaurants along the caravan route are identified in step 428. The points of interest are preferably identified by one or more processors 130, 180 of FIG. 1 based on map data or other information stored in memory or obtained via a central server, vehicle to vehicle communications, and/or one or more other sources.

The identified points of interest of step 428 are then displayed along with a query for the caravan members to select one of the identified points of interest (step 430). Preferably, the display and notification unit 128 of each vehicle 102 in the caravan 104 displays the identified points of interest of step 428 for further voting by the caravan members. The identified points of interest are preferably displayed for each of the vehicles 102 in the caravan 104 via the display and notification units 128 thereof based on instructions provided by one or more of the processors 130, 180 of FIG. 1 and as transmitted by transmitters of the respective interfaces 125, 173.

Selection inputs (or votes) are received from other members of the caravan in response to the query of step 430 (step 432). In one embodiment, the members of the caravan provide the selection inputs or votes in step 432 to vote on the specific point of interest for the caravan stop. This may comprise a further level of feedback, or a further sub-category, from the category of points of interest (e.g., restaurants) initially indicated in the request of step 410. For example, if the initial request of step 410 was for "food" or "restaurant" and the query of step 430 pertained to a McDonald's™ brand restaurant, a Burger King™ brand restaurant, and a Carl's Junior™ brand restaurant along the caravan route, then in one embodiment the inputs (or votes) of step 432 pertain to the caravan members' votes as to which specific restaurant location of restaurants the caravan members would prefer to stop at. In one such embodiment, this could be a multi-step process, for example, (1) a first step or sequence in determining the brand of the restaurant or other point of interest (e.g., McDonald's), and (2) a second step or sequence in determining which specific location for that brand is selected (e.g., the McDonald's at exit A or at address ABC). The inputs are preferably received by the interfaces 125 (e.g., input devices 124) and processed and tallied by one or more processors, such as the processor 180 of the central server 106 and/or by one or more processors 130 of the vehicles 102 and transmitted via the wireless network 108.

The selection inputs (or votes) of step 432 are then displayed (step 434). Preferably, the display and notification unit 128 of each vehicle 102 in the caravan 104 displays the selection inputs (or votes) from step 432 from each of the vehicles 102 in the caravan via instructions provided by one or more of the processors 130, 180. For example, if the voting pertains to the above-referenced fast food restaurants, then during step 434 a display is provided for the number of votes for each of the identified fast food restaurants.

A determination is made with respect to the inputs and voting of step 432 (step 436). Specifically, a determination is made as to the specific location (e.g., name and address) of the point of interest that will be visited by the caravan. For example, in the above-described example in which the caravan is stopping for food, then the determination of step 436 may include a name and address of the selected restaurant (e.g., McDonald's at exit A, or McDonald's at XYZ address, or the like). In one embodiment, this determination is made by the leader of the caravan, and is received via the input device 124 of the leader's vehicle 102. In another embodiment, the determination is made by one or more of the processors 130, 180 of FIG. 1, for example as being the specific point of interest with the most votes in step 432.

With reference again to FIG. 7, in one example, the display 700 includes nearby restaurant locations 714 along with distances 716 and estimated times of arrival 718 for the different restaurant locations 714 from the vehicle (preferably, with respect to the host vehicle for this particular display).

Returning to FIG. 4, a display is provided for the selected destination along with a query is then made as to whether individual caravan participants will participate in the vehicle stop (step 438). The display and query of step 438 is preferably made via the display and notification units 128 of each of the vehicles 102 in the caravan 104 of FIG. 1 by one or more of the processors 130, 180 of FIG. 1.

Final inputs are received from the members of the caravan in response to the query of step 438 (step 440). In one embodiment, occupants of each of the vehicles in the caravan provide a response as to whether his or her vehicle will participate in the vehicle stop selected in step 436. The final inputs of step 440 are preferably received by the interfaces 125 (e.g., input devices 124) and processed and tallied by one or more processors, such as the processor 180 of the central server 106 and/or by one or more processors 130 of the vehicles 102 and transmitted via the wireless network 108.

The caravan is then updated in response to the final inputs received in step 440 (step 442). Specifically, in one preferred embodiment, one or more of the processors 130, 180 of FIG. 1 updates the tracking of the caravan 104 of FIG. 1 to indicate which vehicles 102 are stopping at the point of interest selected in step 436. Those vehicles 102 choosing not the stop at the selected point of interest may or may not remain in the caravan, depending upon whether they exit the boundaries of the caravan 104 per the discussion above in connection with the sub-process of FIG. 3. For example, a member that chooses not to make a quick gasoline stop with the caravan 104 may still remain with the caravan 104, while a member that chooses to keep driving rather than stop for lodging may leave the caravan, in certain examples. In addition, as mentioned above in the discussion of the sub-process of FIG. 3, certain vehicles may leave and then re-enter the caravan in various embodiments.

It will be appreciated that the disclosed systems and processes may differ from those depicted in the Figures and/or described above. For example, the vehicles 102, central server 106, control systems 110, and/or various parts and/or components thereof may differ from those of FIG. 1 and/or described above. Similarly, certain steps of the process 200 may be unnecessary and/or may vary from those depicted in FIGS. 2-7 and described above. It will similarly be appreciated that various steps of the process 200 may occur simultaneously or in an order that is otherwise different from that depicted in FIGS. 2-7 and/or described above. It will similarly be appreciated that, while the disclosed methods and systems are described above as being used in connection with automobiles such as sedans, trucks, vans, and sports utility vehicles, the disclosed methods and systems may also be used in connection with any number of different types of vehicles, and in connection with any number of different systems thereof and environments pertaining thereto While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

The invention claimed is:

1. A method comprising:
receiving a request from a first vehicle, the request pertaining to a desire to make a particular type of stop at a particular category of point of interest en route to a destination, wherein the first vehicle is part of a caravan, along with one or more additional vehicles, en route to the destination, and the particular category of point of interest is suggested by an occupant of the first vehicle;
transmitting information pertaining to the request to the additional vehicles that are also en route to the destination;
obtaining feedback from multiple vehicles in the caravan, the feedback comprising voting from the multiple vehicles pertaining to a desired location for the stop in response to the request, wherein the step of obtaining feedback comprises:
receiving suggestions for a plurality of particular sub-categories of interest from the additional vehicles, each of the additional vehicles being different from the first vehicle, in response to the request from the first vehicle, wherein each of the plurality of sub-categories suggested by the additional vehicles comprises a respective sub-category of the particular category of point of interest that was suggested by the occupant of the first vehicle, and wherein each of the plurality of sub-categories is suggested by a respective occupant of one of the additional vehicles that is different from the first vehicle;
voting, among the caravan, on the plurality of sub-categories, resulting in a selected sub-category of point of interest based on the voting;
establishing a geo-fence for the caravan, the geo-fence comprising a virtual marking on a map around the caravan that represents a boundary comprising geographic limits on the outer bounds of the caravan;
monitoring a position of each of the additional vehicles with respect to the boundary of the geo-fence; and
for each particular vehicle of the additional vehicles;
maintaining the particular vehicle within the caravan if the particular vehicle remains within the boundary of the geo-fence;
removing the particular vehicle from the caravan if the particular vehicle moves beyond the boundary of the geo-fence; and
re-adding the particular to the caravan, if the particular vehicle was previously associated with the caravan and has moved again with the boundary of the geo-fence.

2. The method of claim 1, wherein the particular category is selected from the group consisting of (a) restaurants, (b) service stations, (c) lodging facilities, and (d) rest stops.

3. The method of claim 2, wherein the comprises a particular type of restaurant, service station, lodging facility, or rest step, in response to the request.

4. The method of claim 3, further comprising:
transmitting, to the first vehicle and the one or more additional vehicles, names of a plurality of specific potential points of interest along the route, each of the specific points of interest corresponding to the selected sub-category; and
receiving input from the first vehicle, one or more of the additional vehicles, or both, comprising voting on the specific points of interest corresponding to the selected sub-category along the route, resulting in a selected point of interest of the plurality of specific potential points of interest based on the voting on the specific points of interest.

5. The method of claim 4, further comprising:
transmitting, to the first vehicle, one or more of the additional vehicles, or both, the selected point of interest of the plurality of specific potential points of interest; and
providing a display of the caravan, including positions of the first vehicle and the additional vehicles, along the selected point of interest of the plurality of specific potential points of interest.

6. The method of claim 2, wherein:
the particular category comprises restaurants;
wherein the obtaining of feedback comprises:
obtaining feedback from the additional vehicles as to particular restaurant types; and
facilitating voting among the caravan as to the different restaurant types.

7. The method of claim 6, further comprising:
transmitting, to the first vehicle and the one or more additional vehicles, names of a plurality of specific restaurants along the route, each of the specific restaurants belonging to the particular restaurant type; and
facilitating voting among the caravan as to a selected restaurant of the plurality of specific restaurants.

8. The method of claim 1, further comprising:
transmitting, to each vehicle in the caravan, names of a plurality of specific potential points of interest along the route, each of the specific points of interest corresponding to the selected sub-category;
receiving input from multiple vehicles of the caravan, comprising voting on the specific points of interest corresponding to the selected sub-category along the route, resulting in a selected point of interest of the plurality of specific potential points of interest based on the voting on the specific points of interest; and
providing a display of the caravan, including the boundary of the geo-fence along with positions of the vehicles in the caravan and the selected point of interest.

* * * * *